United States Patent [19]

Funahashi et al.

[11] Patent Number: 4,995,093
[45] Date of Patent: Feb. 19, 1991

[54] RADIATION FIELD RECOGNITION METHOD

[75] Inventors: Takeshi Funahashi; Nobuyoshi Nakajima, both of Kanagawa, Japan

[73] Assignee: Fuji Photo Film Co., Ltd., Kanagawa, Japan

[21] Appl. No.: 175,446

[22] Filed: Mar. 30, 1988

[30] Foreign Application Priority Data

Mar. 31, 1987 [JP] Japan .................................. 62-79490

[51] Int. Cl.$^5$ .............................................. G06K 9/00
[52] U.S. Cl. .......................................... 382/6; 382/54; 250/327.2; 364/413.15; 364/413.16; 378/99
[58] Field of Search ............... 382/6, 54, 48; 358/111; 364/413.13, 413.15, 413.16, 413.19; 250/327.2 R, 327.2 A, 327.2 B, 327.2 D; 378/62, 99, 901

[56] References Cited

U.S. PATENT DOCUMENTS

| | | | |
|---|---|---|---|
| 4,258,264 | 3/1981 | Kotera et al. | 250/484 |
| 4,527,060 | 7/1985 | Suzuki et al. | 250/327.2 |
| 4,736,399 | 4/1988 | Okazaki | 378/99 |
| 4,816,676 | 3/1989 | Aagano | 250/327.2 B |
| 4,816,690 | 3/1989 | Adachi et al. | 250/327.2 B |
| 4,829,181 | 5/1989 | Shimura | 250/327.2 D |
| 4,851,678 | 7/1989 | Adachi et al. | 250/327.2 |

*Primary Examiner*—David K. Moore
*Assistant Examiner*—Jose L. Couso
*Attorney, Agent, or Firm*—Sughrue, Mion, Zinn Macpeak & Seas

[57] ABSTRACT

A method of recognizing (distinguishing) a radiation field is provided for radiation image recording and reproducing systems that utilize stimulable phosphor sheets. With respect to the process of reproducing radiation image information stored on the phosphor sheet by scanning it with stimulating rays, such as laser light, the present method allows the radiation field on the sheet to be precisely distinguished, reducing the influence of undesirable stored image energy emissions from outside the prescribed region. This enables radiation images to be obtained that are more effective for diagnostic purposes. The method can also be applied for the recognition of irregularly shaped radiation fields, which hitherto has been extremely difficult.

4 Claims, 4 Drawing Sheets

RADIATION FIELD RECOGNITION METHOD

BACKGROUND OF THE INVENTION

1. Field of the Invention

This invention relates to a method of recognizing a radiation field on a stimulable phosphor sheet on which radiation image information has been recorded, in the process of reading out the recorded radiation image information by exposing the stimulable phosphor sheet to stimulating rays, causing the stimulable phosphor sheet to emit light, and photoelectrically detecting the emitted light.

2. Description of the Prior Art

When certain kinds of phosphors are exposed to a radiation such as x-rays, α-rays, β-rays, γ-rays, electron rays or ultraviolet rays, they store a part of the energy of the radiation. When the phosphor that has been exposed to the radiation is then exposed to stimulating rays such as visible light, light is emitted from the phosphor in proportion to the stored energy of the radiation. A phosphor exhibiting such properties is referred to as a stimulable phosphor.

As disclosed in the applicant's Japanese Unexamined Patent Publication Nos., 55(1980)-12429 (U.S. Pat. No. 4,258,264) and 56(1981)-11395, it has been proposed to use such a stimulable phosphor in a radiation image recording and reproducing system. Specifically, a sheet provided with the stimulable phosphor is exposed to a radiation passing through an object, such as the human body, to have a radiation image stored thereon, and the sheet is then scanned with stimulating rays such as a laser beam to cause it to emit light, which is photoelectrically detected and converted to an image signal that is used to reproduce a visible image of the radiation image on a recording medium such as a photographic light-sensitive material or on a display means such as a cathode ray tube (CRT).

This method using a stimulable phosphor sheet is advantageous compared with conventional radiographic methods using silver halide photographic material in that the image can be recorded over a very wide range of radiation exposure. More specifically, since the amount of light emitted upon stimulation after the radiation energy is stored on the stimulable phosphor is proportional to the amount of energy stored thereon over an extremely wide range, it is possible to obtain a radiation image regardless of the amount of exposure of the stimulable phosphor to the radiation, by reading out the emitted light with an appropriate gain and converting it to an electric image signal to reproduce a visible image on a recording medium such as a photographic light-sensitive material or a display device such as a CRT.

This system is also highly advantageous in that after the radiation image information stored on the stimulable phosphor sheet has been read out and converted to an electrical signal, the image signal can be appropriately processed to obtain a radiation image suitable for observation, particularly for diagnostic purposes, when it is used to reproduce a radiation image as a visible image on a photographic light-sensitive material or on a display device such as a CRT.

In such a radiation image system using a stimulable phosphor sheet, the read-out gain can be adjusted to an appropriate value when photoelectrically reading out the light emitted by the stimulable phosphor sheet upon stimulation thereof to produce a visible image. Therefore it is possible to obtain a reproduced radiation image that is not adversely affected by fluctuations in radiation dose caused by fluctuations in the tube voltage or MAS value of the radiation source, variation in the sensitivity of the stimulable phosphor sheet or the photodetector, a change in radiation dose according to the condition of the object, or a fluctuation in the radiation transmittance according to the object, and other such factors causing deviation in the level of the radiation energy stored on the stimulable phosphor sheet. Also, it is possible to obtain a desirable radiation image even when the radiation dose to the object is low.

However, in order to eliminate various effects caused by the fluctuation of radiographic exposure conditions and to obtain a radiation image having high image quality, it is necessary to ascertain the image input conditions of the radiation image stored on the stimulable phosphor sheet and the image input pattern as determined by the portion of the body, for example the chest or the abdomen, or the radiographic method used, such as plain image or contrasted image radiography, before reproducing the radiation image as a visible image for viewing, and then to adjust the read-out gain appropriately based on the detected input conditions and the image input pattern. The image input conditions and the image input pattern will hereinafter be referred to as the image input information when they are referred to generically. It is also necessary to determine the scale factor to optimize the resolution in accordance with the contrast of the image input pattern.

The image input information can be ascertained prior to the outputting of the visible image by use of the method disclosed in Japanese Unexamined Patent Publication No.58(1983)-67240 (U.S. Pat. No. 4,527,060). According to this method, a read-out operation for detecting the image input information of a radiation image stored on a stimulable phosphor sheet (hereinafter referred to as the preliminary read-out) is conducted beforehand by use of stimulating rays having a stimulation energy of a level that is lower than the level of the stimulation energy of stimulating rays used in a read-out operation for obtaining a visible image for observation (hereinafter referred to as the final read-out), and then, on the basis of the information obtained from the preliminary read-out, the final read-out gain is adjusted to an appropriate level, the scale factor is set, and the signal processing conditions are set.

Here, the description that the level of the stimulating rays used in the preliminary read-out is lower than the level of the stimulating rays used in the final read-out means that the effective energy of the stimulating rays which the stimulable phosphor sheet receives per unit area in the preliminary read-out is to be lower than the effective energy of the stimulating rays used in the final read-out. In order to make the level of the stimulating rays used in the preliminary read-out lower than the level of the stimulating rays used in the final read-out, the output of the stimulating ray source, for example, a laser beam source, may be decreased in the preliminary read-out, or the stimulating rays emitted by the stimulating ray source may be attenuated by an ND filter, an AOM or the like positioned on the optical path. Alternatively, a stimulating ray source for preliminary read-out may be provided independently of the stimulating ray source for the final read-out, and the output of the former may be made lower than the output of the latter. Or, the beam diameter of the stimulating rays may be increased, the scanning speed of the stimulating rays may be increased, or the transport speed of the stimulable phosphor sheet may be increased in the preliminary read-out.

Since with the aforesaid method the image input conditions and the image input pattern of a radiation image stored on the stimulable phosphor sheet can be ascertained in advance, even without using a read-out system having a particularly wide dynamic range it is possible to obtain a radiation image that is highly suitable for observation purposes by, on the basis of the recorded information, appropriately adjusting the read-out gain, setting the scale factor input information, and processing the detected electric image signal in accordance with the image input pattern.

A number of methods have been considered for ascertaining the information stored on the stimulable phosphor sheet on the basis of the preliminary read-out image signal obtained by the preliminary read-out. One such method involves preparing a histogram of the preliminary read-out signal. Specifically, as the stored information could be ascertained from signal maximum and minimum values and points of maximum frequency on the histogram, setting read-out conditions such as read-out gain and scale factor and image processing conditions on the basis of the histogram would enable the reproduction of radiation images having good diagnostic efficiency.

In the recording (photography) of radiation image information, with respect to the total recording region of the stimulable phosphor sheet, photography is usually performed with the field stopped-down to the radiation field in order to avoid the irradiation of diagnostically unnecessary portions, or to prevent contrast resolution being degraded by light scattering from diagnostically unnecessary portions intruding into diagnostically necessary portions.

However, the following problem arises when the above method is used to ascertain the information recorded on the stimulable phosphor sheet. With reference to FIG. 2, when radiation of a recorded image region of a stimulable phosphor sheet 103 is restricted to a field B and preliminary read-out is performed in respect of a region that is notably larger than the field B, for example the whole of the recording area, it gives rise to an incorrect grasp of what information is actually recorded within the field B. This means that in the above case a histogram will also include preliminary read-out signals from areas outside the field B. Therefore, in this case the histogram would not correctly reflect the information actually contained within the field B.

The applicant has proposed a number of methods for recognizing the above field B (for example, in Japanese Unexamined Patent Publication No. 61(1986)-39039) (U.S. Pat. No. 4,851,678). Use of such a method to recognize the radiation field and carry out preliminary read-out only in respect of the region of the said field enables the above problem to be resolved. However, in most of the conventional radiation field recognition methods the recognition of the field is carried out on the assumption that the field is trapezoidal in shape, and correct recognition of a field has been very difficult when the shape of the field is an irregular polygon.

SUMMARY OF THE INVENTION

It is therefore an object of this invention to provide a method that also enables irregularly shaped radiation fields to be recognized accurately.

The radiation field recognition method according to this invention comprises: applying the aforementioned radiation field stop and obtaining candidate edge points that may be considered to be edge portions of a radiation field on a stimulable phosphor sheet in the course of reading out light emitted from the stimulable phosphor sheet on which radiation image information has been recorded to obtain an image signal; obtaining curves in respect of each of the candidate edge point coordinates $(x_0, y_0)$, the curves being expressed as $$\rho = x_0 \cos\Theta + y_0 \sin\Theta \tag{1}$$

with $x_0, y_0$ being constants, when the coordinates of the candidate edge points in a rectangular coordinate system set on the sheet are taken as $(x_0, y_0)$; and from points of intersection $(\rho_0, \Theta_0)$ between the curves, obtaining straight lines in the rectangular coordinate system defined by $$\rho_0 = x \cos\Theta_0 + y \sin\Theta_0 \tag{2}$$

and recognizing the region enclosed by the straight lines as the radiation field.

A signal to indicate the candidate edge points may be obtained by differential processing of a preliminary read-out image signal that has been digitized, for example. One-dimensional primary differentiation or higher-order differentiation may be used, or two-dimensional primary differentiation. In the case of discretely sampled images, differentiation is equivalent to obtaining the difference between neighboring image signals.

With reference to FIG. 2, if candidate edge points have been obtained on a stimulable phosphor sheet 103 as indicated by the dots, if candidate edge point coordinates in an x--y rectangular coordinate system are $(x_0, y_0)$, equation (1) will yield curves such as the ones shown in FIG. 3. These curves will exist only in the number of candidate edge points; curves based on a plurality of candidate edge points $(x_0, y_0)$ on common straight lines of the x--y rectangular coordinate system will intersect at a point $(\rho_0, \Theta_0)$. FIG. 4 shows a straight line defined by equation (2) based on this intersection point $(\rho_0, \Theta_0)$; the line shown is formed as an extension along the candidate edge points. Therefore, by obtaining as many straight lines as there are intersection points $(\rho_0, \Theta_0)$, the area enclosed by the straight lines will form the radiation field.

DESCRIPTION OF THE PREFERRED EMBODIMENTS

Figure 1:
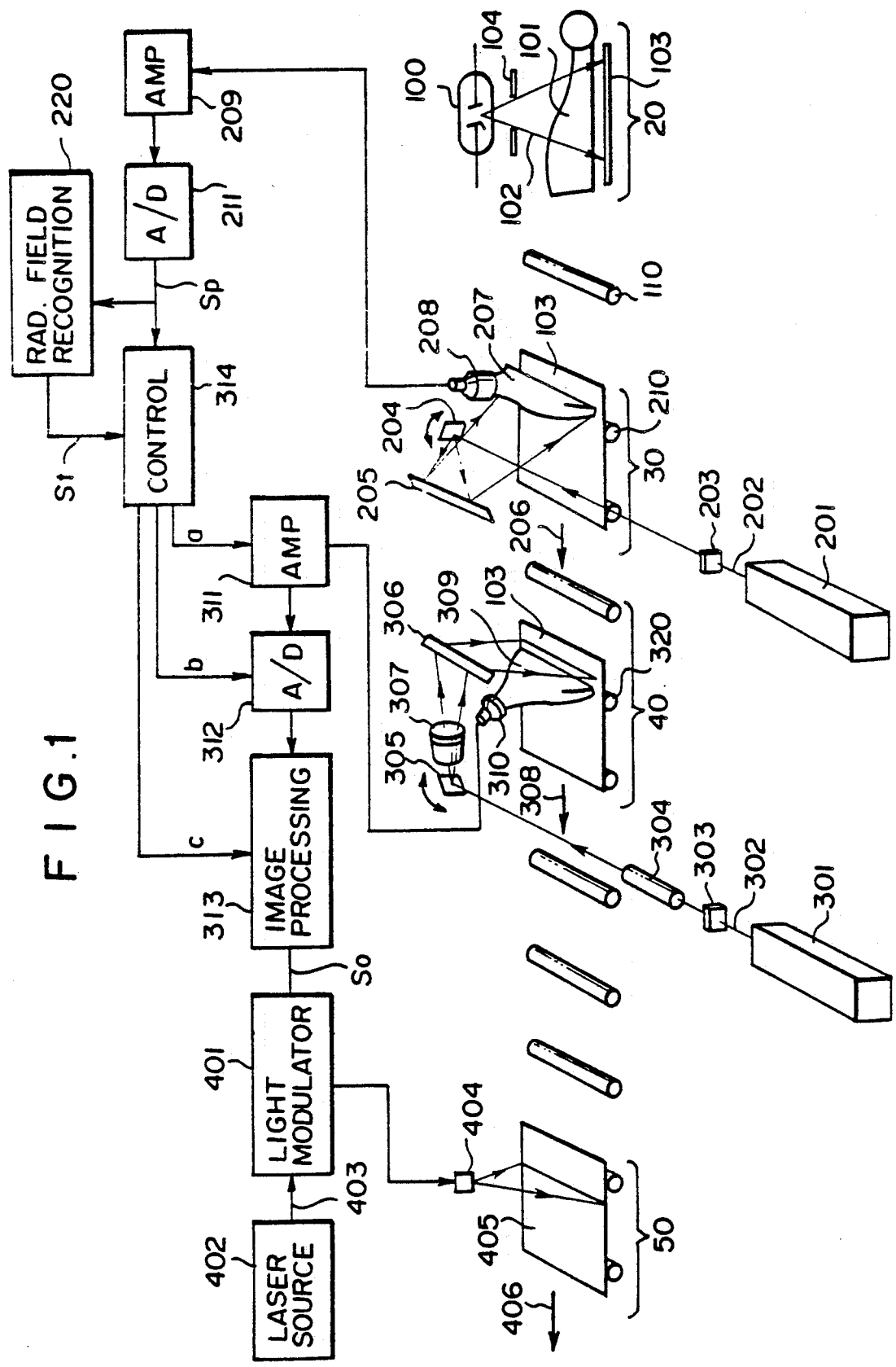
FIG. 1 shows the general arrangement of an apparatus for recognizing a radiation field and performing read-out of radiation image information in accordance with the method of the present invention.

FIG. 1 shows a radiation image information recording and reproduction system configured to recognize a radiation field according to the method of the present invention. The radiation image information recording and reproduction system is basically constituted by a radiation image photography section 20, a preliminary read-out section 30, a final read-out section 40, and an image reproduction section 50. In the radiation image photography section 20, a radiation source 100 such as, for example, an x-ray tube emits a radiation 102 toward an object (patient) 101. A stimulable phosphor sheet 103 which stores radiation energy as described in the foregoing is disposed at a position where it is exposed to the radiation 102 passing through the object 101 so that radiation image information from the passage of the radiation through the object 101 is stored on the stimulable phosphor sheet 103. A radiation field stop 104 is disposed between the radiation source 100 and the object 101 in the field of the radiation 102.

The stimulable phosphor sheet 103 on which radiation image information of the object 101 has thereby been recorded is then transported by a sheet transport means 110 constituted by, for example, transport rollers, to the preliminary read-out section 30. At the preliminary read-out section 30 a laser beam 202 from a preliminary read-out laser light source 201 is passed through a filter 203 that filters out light in the laser beam 202 that is in the wavelength region of light that is emitted by the stimulable phosphor sheet 103 upon stimulation by the laser beam 202. The laser beam 202 is then deflected by a light deflector 204, such as a galvanometer mirror, and projected onto the stimulable phosphor sheet 103 via a plane reflecting mirror 205. The wavelength of the laser beam 202 forming the stimulating radiation generated by a preliminary read-out laser light source 201 is in a region that does not overlap the wavelength region of light emitted by the stimulable phosphor sheet 103. The stimulable phosphor sheet 103 is moved by a sheet transport means 210 in the direction indicated by the arrow 206 for scanning in a sub-scanning direction as a result of which the entire surface of the stimulable phosphor sheet 103 is irradiated by the laser beam 202. Here, the intensity of the light emitted by the preliminary read-out laser light source 201, the diameter of the laser beam 202, the scanning speed of the laser beam 202 and the transport speed of the stimulable phosphor sheet 103 are selected so that the energy of the preliminary read-out stimulating rays (laser beam 202) is less than that of the final read-out performed at the final read-out section 40.

When the stimulable phosphor sheet 103 is thus irradiated by the laser beam 202, the stimulable phosphor sheet 103 emits light in proportion to the stored radiation energy. The light thus emitted passes through a preliminary read-out light guide 207 and is received by a photodetection means 208 that is constituted by a photomultiplier or the like. The light receiving face of the photodetection means 208 is provided with a filter that allows the passage only of light that is within the wavelength region of the light emitted by the sheet 103 and absorbs light in the wavelength region of the stimulating rays, thereby ensuring that only the light emitted by the sheet 103 is detected. The emitted light thus detected is converted into an electrical signal that carries the stored image information. After the signal is then amplified by an amplifier 209 it is digitized by an A/D converter 211 and is input to a control circuit 314 in the final read-out section 40 as a preliminary read-out image signal Sp. This control circuit 314 determines a read-out gain setting a, a scale factor setting b and a reproduction image processing condition setting c on the basis of the stored image information carried by the preliminary read-out image signal Sp. The preliminary read-out image signal Sp is also input into a radiation field recognition circuit 220 that is described later.

After completion of the preliminary read-out the stimulable phosphor sheet 103 is transported to the final read-out section 40. At the final read-out section 40 a laser beam 302 emitted by a final read-out laser light source 301 is passed through a filter 303 that filters out light in the laser beam 302 that is in the wavelength region of light that is emitted by the stimulable phosphor sheet 103 upon stimulation by the laser beam 302. Following this, the diameter of the beam is precisely adjusted by means of a beam expander 304 and the beam is then deflected by a light deflector 305 constituted by a galvanometer mirror, for example, and projected onto the stimulable phosphor sheet 103 via a plane reflecting mirror 306. An fΘ lens 307 is disposed between the light deflector 305 and the plane reflecting mirror 306 to ensure uniformity of the diameter of the laser beam 302 scanning the stimulable phosphor sheet 103. The stimulable phosphor sheet 103 is moved by the sheet transport means 320 in the direction indicated by the arrow 308 for scanning in a sub-scanning direction as a result of which the entire surface of the stimulable phosphor sheet 103 is irradiated by the laser beam. The radiation by the laser beam 302 causes the stimulable phosphor sheet 103 to emit light in proportion to the stored radiation energy, and the light thus emitted impinges on the final read-out light guide 309. The light is guided inside the final read-out light guide 309 by total reflection, exits from the guide 309 and is received by a photodetection means 310 such as a photomultiplier. The light receiving face of the photodetection means 310 is provided with a filter that selectively passes only light that is within the wavelength region of the light emitted by the sheet 103 to ensure that only the light emitted by the sheet 103 is detected by the photodetection means 310.

The emitted light containing the radiation image recorded on the stimulable phosphor sheet 103 is thus photoelectrically detected by the photodetection means 310, producing an output from the photodetection means 310 that is amplified to form an electrical signal of an appropriate level by an amplifier 311 the read-out gain of which is set in accordance with the read-out gain setting a determined by the aforementioned control circuit 314. The amplified signal is input to an A/D converter 312, and in accordance with the scale factor setting b is converted to a digitized signal using a scale factor that matches the signal fluctuation amplitude, and is then input to an image processing circuit 313. The image processing circuit 313 performs signal processing (image processing) based on the reproduction image processing condition setting c to provide a good radiation image for observation and photography.

Following this, the image processing circuit 313 outputs a read-out image signal (final read-out image signal) So that is input to a light modulator 401 in the image reproduction section 50. In the image reproduction section 50, a laser beam 403 produced by a laser light source 402 is modulated by the light modulator 401 in accordance with the read-out image signal So from the image processing circuit 313 and is then deflected by a scanning mirror 404 to scan a photosensitive material 405 such as photographic film. The photosensitive material 405 is transported in synchrony with the scanning in a direction, indicated by arrow 406, that is at right-angles to the direction of the above scanning, so that a radiation image based on the read-out image signal So is output to the photosensitive material 405. Other methods may be employed to reproduce the radiation image, such as for example the aforementioned method employing a CRT display means.

Figure 2:
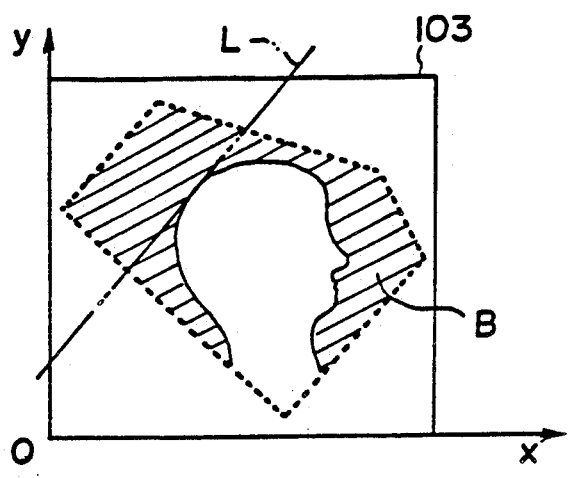
FIG. 2 is an explanatory drawing illustrating radiation image information recording conditions of a stimulable phosphor sheet, according to the invention.
Figure 5:
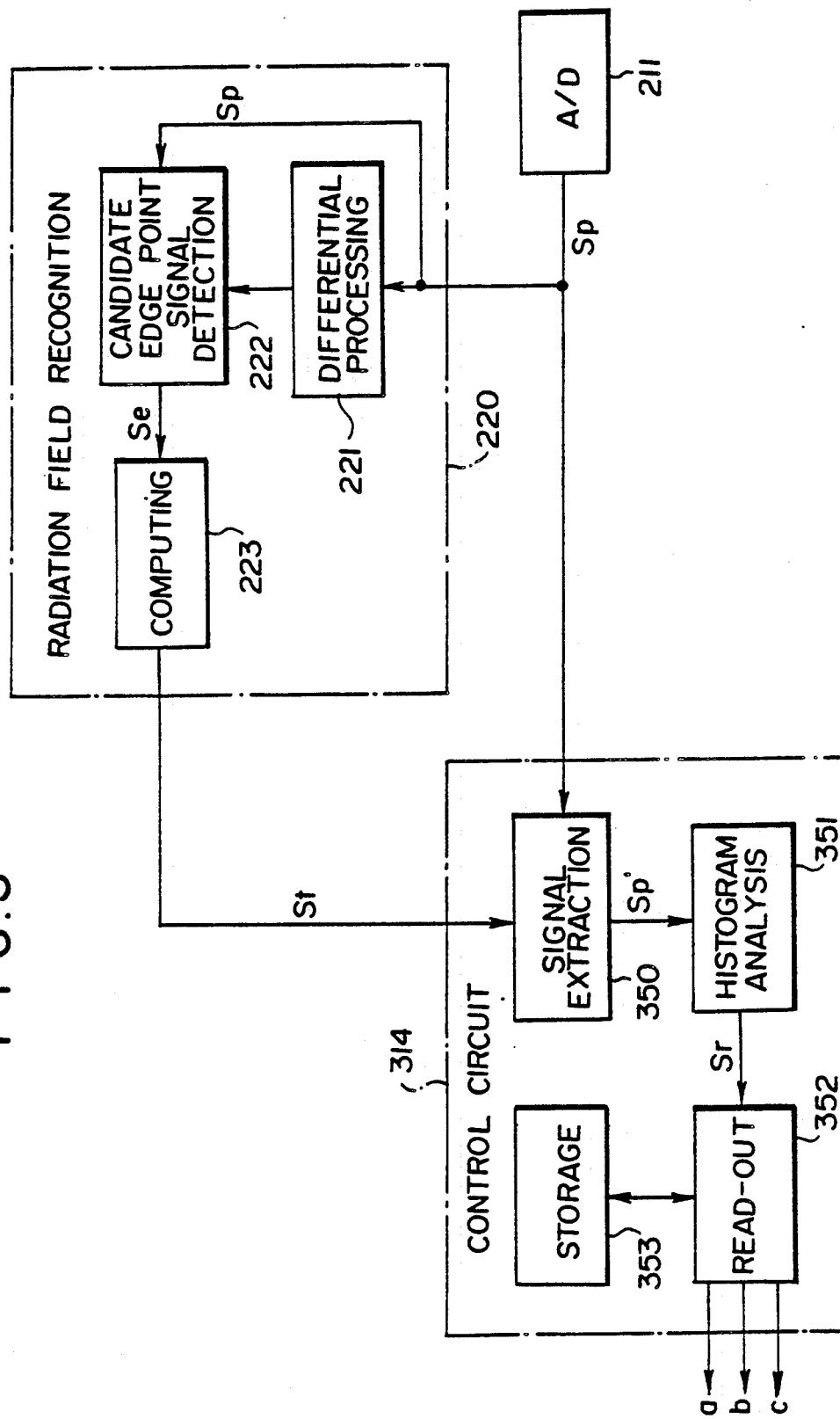
FIG. 5 is a block diagram showing details of a part of the apparatus of FIG. 1.

The arrangement whereby the read-out gain setting a, scale factor setting b and reproduction image processing condition setting c are determined appropriately will now be described with reference to FIG. 5, in the case where the radiation field is limited to the field B on the stimulable phosphor sheet 103, as shown in FIG. 2. In FIG. 5, the control circuit 314 is constituted by a signal extraction section 350, a histogram analysis section 351, a read-out section 352 and a storage section 353. The preliminary read-out signal Sp is input to the signal extraction section 350 where a preliminary read-out image signal Sp' is extracted in respect just of a region prescribed as described later. The preliminary read-out image signal Sp' output by the signal extraction section 350 is input to the histogram analysis section 351. The histogram analysis section 351 produces a histogram of the preliminary read-out image signal Sp', finding, for example, maximum and minimum values and maximum frequency values and the like, and information Sr containing these values is sent to the read-out section 352. The optimum read-out gain setting a, scale factor setting b and reproduction image processing condition setting c corresponding to these maximum and minimum values and the like are stored in the storage section 353. The read-out section 352 reads out from the storage section 353 the values of the settings a, b and c corresponding to the information Sr and, as described in the foregoing, these are fed to the amplifier 311, the A/D converter 312 and the image processing circuit 313, respectively.

Signal extraction by the signal extraction section 350 will now be described. The radiation field recognition circuit 220 is constituted by a differential processing section 221, a candidate edge point signal detection section 222 and a computing section 223. In the radiation field recognition circuit 220 the preliminary read-out image signal Sp is input into the differential processing section 221 and the candidate edge point signal detection section 222. The differential processing section 221 performs differential processing of predetermined picture elements of the digitized preliminary read-out image signal Sp in predetermined directions, thereby obtaining the difference. The candidate edge point signal detection section 222 extracts the preliminary read-out image signal Sp for points where the differential exceeds the predetermined values, the locations of the picture elements corresponding to the preliminary read-out image signal Sp thus extracted are obtained, and information Se indicating the picture element locations is fed to the computing section 223. The major part of the preliminary read-out image signals Sp thus extracted relate to the edge portion of the radiation field B on the stimulable phosphor sheet 103 (FIG. 2), i.e., they form candidate edge point signals. Details of the above-mentioned differential processing and differential detection can be found in Japanese Unexamined Patent Publication No. 61(1986)-39039 (U.S. Pat. No. 4,851,678). Detection of the edge portion of an image can also be carried out by a method disclosed in the applicant's Patent Application No. 60(1985)-155845 (U.S. Pat. No. 4,851,678). The picture element locations can be represented as an x--y rectangular coordinate system on the stimulable phosphor sheet 103, as shown in FIG. 2.

Figure 3:
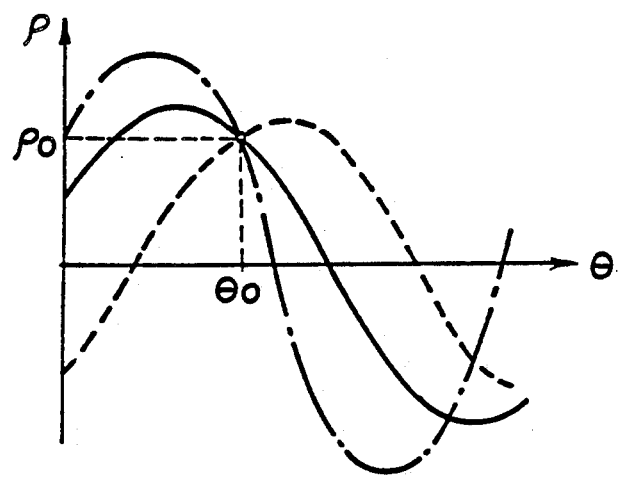
FIGS. 3 and 4 are graphs showing curves for the radiation field recognition method of the invention.
Figure 4:
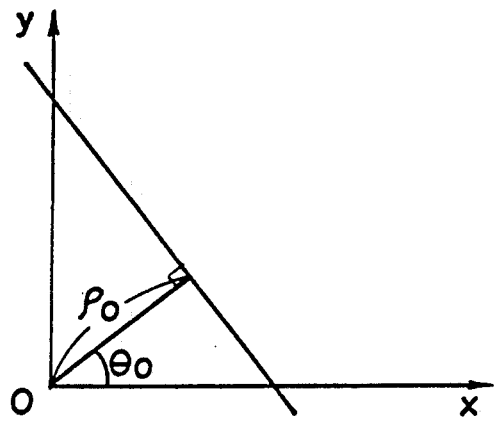

For all of the candidate edge point coordinates ($x_0$, $y_0$), the computing section 223 calculates curves expressed as $$\rho = x_0 \cos\Theta + y_0 \sin\Theta$$

when the coordinates of the picture element locations (candidate edge points) shown by the information Se are taken as ($x_0$, $y_0$), where $x_0$, $y_0$ are constants. As stated, FIG. 3 shows the type of curves that are thus produced and which exist only in the number of candidate edge point coordinates ($x_0$, $y_0$).

Following this, the computing section 223 calculates the point of mutual intersection ($\rho_0$, $\Theta_0$) of a minimum prescribed number Q of the said plurality of curves. Owing to error and the like in the candidate edge point coordinates ($x_0$, $y_0$), a large number of curves seldom intersect precisely at one point. Hence, when in practice there is a gap between the points of intersection of two curves, for example, that does not exceed a prescribed minute value, the center of the group of intersection points is regarded as the above point of intersection ($\rho_0$, $\Theta_0$). Next, from the point of intersection ($\rho_0$, $\Theta_0$) the computing section 223 computes straight lines in the x--y rectangular coordinate system that are prescribed by the following equation.

$$\rho_0 = x \cos\Theta_0 + y \sin\Theta_0$$

As mentioned in the foregoing, these straight lines are formed as extensions along the line of the plurality of candidate edge point coordinates ($X_0$, $Y_0$). Because portions in the radiation field B exhibiting sharp changes in density, such as around the periphery of bones, are also detected as candidate edge points, there is a possibility that, as shown in FIG. 2, a straight line L may be obtained that connects just such a candidate edge point with a candidate edge point on the periphery of the radiation field. However, this type of straight line L will not be derived provided the prescribed number Q is set to a high enough value, such as for example 20 or more. If this is done, straight lines will only be obtained along large numbers of candidate edge points, revealing the outline of the radiation field.

Figure 6:
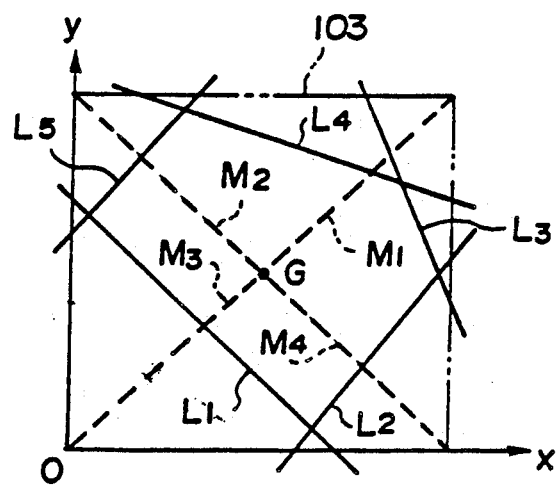
FIG. 6 is an explanatory diagram for explaining the region extraction method of the present invention.

The distribution of candidate edge points shown in FIG. 2 will give rise to straight lines such as those shown in FIG. 6.

The computing section 223 next derives a region circumscribed by a plurality of the thus-obtained lines L1, L2, L3 . . . Ln that is recognized as the radiation field B. More specifically, this region is recognized as described hereinbelow. The computing section 223 stores line components M1, M2, M3 . . . Mn (four in the case of a trapezoidal stimulable phosphor sheet 103) that extend from the corner portions of the stimulable phosphor sheet 103 to the center G, and checks for the presence or absence of points of intersection between the line components M1, M2, M3 . . . Mn and the straight lines L1, L2, L3 . . . Ln. When there is such an intersection point, of the two parts into which the plane is divided by the straight lines, the part that includes the corner portions of the sheet is ignored. Repeating this operation for each of the straight lines L1, L2, L3 ... Ln and line components M1, M2, M3 ... Mn leaves a region circumscribed by the straight lines L1, L2, L3 ... Ln. This region is the radiation field B. The computing section 223 feeds information St that shows the radiation field B thus recognized to the signal extraction section 350 of the control circuit 314. The signal extraction section 350 extracts from the preliminary read-out image signals Sp only signals relating to the region indicated by the information St and feeds them to the histogram analysis section 351. The histogram analysis section 351 therefore performs histogram analysis only with respect to the region on which the radiation actually impinges, so that the read-out gain setting a, scale factor setting b and reproduction image processing condition setting c become the optimum values for the image information that is actually stored.

Other methods that may be employed to recognize the region enclosed by the straight lines L1, L2, L3 ... Ln include one that utilizes points of intersection between two of the straight lines L1, L2, L3 ... Ln. This method will now be described. If the intersection points of the said two straight lines represented beforehand in an overall fashion as $(\rho_0, \Theta_0)$ are shown as $(\rho_1, \Theta_1)$ $(\rho_2, \Theta_2)$ for each of the straight lines in the x--y rectangular coordinate system, they can be represented as $$\rho_1 = \cos\theta_1 + y \sin\theta_1$$

$$\rho_2 = \cos\theta_2 + y \sin\theta_2$$

From these equations the coordinates $(x_2, y_2)$ of the points of intersection of the two straight lines are found by the following equations.

$$x_2 = \frac{\rho_1 \sin\theta_2 - \rho_2 \sin\theta_1}{\cos\theta_1 \sin\theta_2 - \cos\theta_2 \sin\theta_1}$$

$$y_2 = \frac{\rho_1 \cos\theta_2 - \rho_2 \cos\theta_1}{\sin\theta_1 \cos\theta_2 - \sin\theta_2 \cos\theta_1}$$

Figure 7:
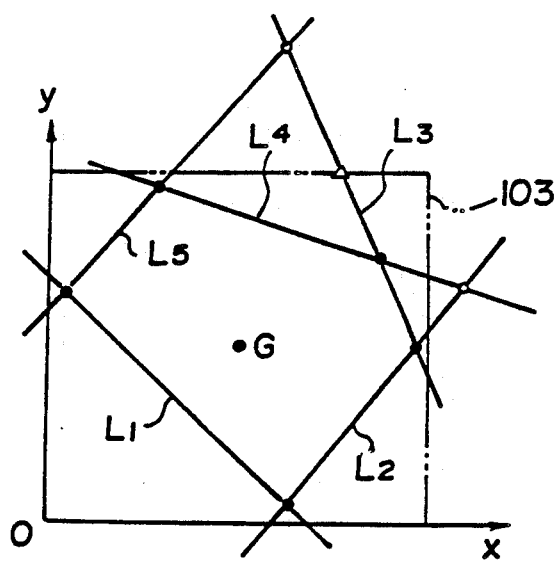
FIGS. 7 and 8 are explanatory diagrams each illustrating a different embodiment of the region extraction method.

Of the points of intersection of the two straight lines thus obtained, n points form vertices of the polygonal radiation field B, and are shown in FIG. 7 as black dots. Points of intersection other than these do not form a vertex, and are shown as white dots in FIG. 7. Next, therefore, only the points of intersection that form a vertex are extracted. For this, use is made of the fact that line components that link points of intersection forming a vertex with a point inside the polygonal region do not intersect any of the straight lines L1, L2, L3 ... Ln, but line components that link other points of intersection that form a vertex with a point inside the polygonal region do intersect one or the other of the straight lines L1, L2, L3 ... Ln. Specifically, on the basis of an assumption that the radiation field B is positioned to include the center G of the sheet 103, if $(X_1, Y_1)$ are the coordinates of the center G and $(X_2, Y_2)$ are the coordinates of the above points of intersection, the coordinates $(X_3, Y_3)$ of the points of intersection of the line components linking the center G and the intersection points with the straight lines L1, L2, L3 ... Ln are $$x_3 = \frac{b\sin\theta_0 - \rho_0}{a\sin\theta_0 - \cos\theta_0} \quad (3)$$

$$y_3 = \frac{b\cos\theta_0 - \rho_0 a}{\cos\theta_0 - a\sin\theta_0} \quad (4)$$

However, $$a = (y_1 - y_2)/(x_2 - x_1)$$

$$b = (y_1 x_2 - y_2 x_1)/(x_2 - x_1)$$

and $\rho_0$, $\Theta_0$ are values that define each of the straight lines L1, L2, L3 ... Ln.

Regarding points of intersection $(X_2, Y_2)$, when the integrals of equations (3) and (4) form coordinates on a line component linking $(X_1, Y_1)$ and $(X_2, Y_2)$ (excluding, however, $(X_1, Y_1)$ and $(X_2, Y_2)$), the points of intersection thereof $(X_2, Y_2)$ do not form a vertex of the polygonal radiation field B, while when the integrals do not form coordinates on a line component linking $(X_1, Y_1)$ and $(X_2, Y_2)$, the points of intersection thereof do form a vertex of the polygon.

As such, by excluding all points of intersection where the coordinate values of the line component do not form an integral, it becomes possible to obtain n intersections forming a vertex of the polygon. Employing the thus-obtained coordinates of n intersections and the aforementioned equation used to obtain n straight lines L1, L2, L3 ... Ln enables a region to be obtained enclosed by the straight lines L1, L2, L3 ... Ln, i.e., the radiation field B.

Figure 8:
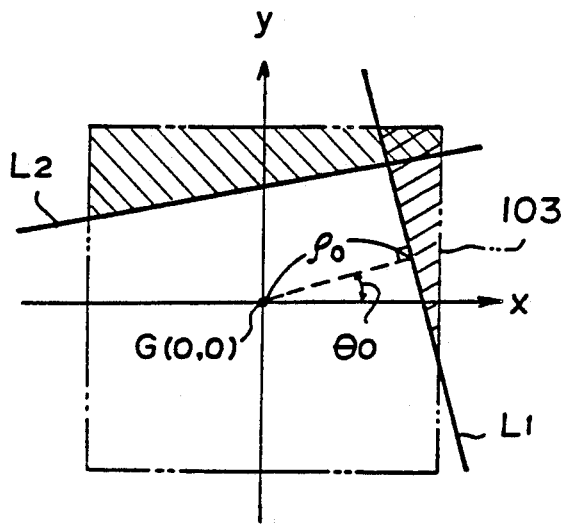

To extract the region enclosed by the straight lines L1, L2, L3 ... Ln the center G (or the vicinity thereof) of the stimulable phosphor sheet 103 can be set as the origin of the rectangular coordinate system as shown in FIG. 8, and with respect to straight lines L1, L2, L3 ... Ln prescribed by $0 < \Theta_0 < 2\pi$, the regions corresponding to the following may be ignored.

If $\pi/4 < \theta_0 \leq 3\pi/4$
then $y > (\rho_0 - x\cos\theta_0)/\sin\theta_0$ (1)

If $3\pi/4 < \theta_0 \leq 5\pi/4$
then $x < (\rho_0 - y\sin\theta_0)/\cos\theta_0$ (2)

If $5\pi/4 < \theta_0 \leq 7\pi/4$,
then $y < (\rho_0 - x\cos\theta_0)/\sin\theta_0$ (3)

If $7\pi/4 < \theta_0 \leq 2\pi$ or $0 < \theta_0 \leq \pi/4$,
then $x > (\rho_0 - y\sin\theta_o)/\cos\theta_0$ (4)

In accordance with these equations, in the case of the straight line L1 shown in FIG. 8 (corresponding to the above case (4)) it will be the region to the right that is disregarded; with respect to the straight line L2 (corresponding to the above case (1)) it will be the upper region that is disregarded; while in the case of (2) and (3), it will be the left and lower regions, respectively, that are disregarded. As a result, a region can be extracted enclosed by straight lines L1, L2, L3 ... Ln.

When a radiation field is not stopped on the stimulable phosphor sheet 103, it follows that the information St output by the computing section 223 will show the whole area of the stimulable phosphor sheet 103, so in this case, too, the values of the read-out gain setting a, scale factor setting b and reproduction image processing condition setting c will be set appropriately. However, in order to avoid unnecessary processing by the radiation field recognition circuit 220, a switch is provided that enables the radiation field recognition circuit 220 to be switched on or off, the arrangement being such that when the radiation field recognition circuit 220 is switched off the signal extraction section 350 permits passage of all preliminary read-out image signals Sp. When it is known beforehand that read-out is going to be performed without a radiation field stop being used on the stimulable phosphor sheet 103, manual operation can be used to expedite input of the preliminary read-out image signals Sp to the histogram analysis section 351.

The read-out region in the final read-out section 40 may also be controlled based on the information St showing the radiation field B obtained by the radiation field recognition circuit 220. This will result in final read-out being performed only with respect to the radiation field, speeding up read-out processing.

The apparatus as illustrated in FIG. 1 is provided with separate final and preliminary read-out sections. However, a combined final and preliminary read-out system such as the one disclosed in Japanese Unexamined Patent Publication No. 58(1983)-67242 (U.S. Pat. No. 4,527,060) may be used, whereby when the preliminary read-out is completed a sheet transport means returns the stimulable phosphor sheet to the read-out system for final read-out. A stimulating energy adjustment means is used to adjust the energy used during the preliminary read-out to a level that is lower than the level of the energy used in the final read-out. The method of the present invention is also applicable when read-out of radiation image information is carried out by means of such an apparatus.

Although in the above-described embodiments the radiation field is recognized based on preliminary read-out image signals, it is to be understood that the final read-out image signals could be utilized for this purpose. In such a case, radiation image information that has been recognized could be utilized, for example to adjust reproduction image processing condition setting c to an appropriate value.

As has been described in the foregoing, in accordance with the radiation field recognition method of the present invention, during preliminary read-out the influence of portions outside the radiation field can be excluded to thereby obtain an accurate grasp of the recorded image information relating to an object, and final read-out conditions, picture element processing conditions and so forth can be set to optimum levels. Accordingly, with the method of the present invention it is possible to consistently reproduce radiation images of excellent efficiency for observation/photography. Moreover, as this method provides reliable recognition even when the shape of the radiation field is an irregular polygon, the need to limit the field to a prescribed shape for radiographic purposes is eliminated, removing limitations on photography conditions and simplifying photographic operations.

It should be noted that the center or central portion G of the stimulable phosphor sheet may not always be the geometrical center of the sheet, but may be the weighted center of the density of the image recorded thereon or the weighted center of the intensity of the light emitted from the sheet upon exposure to the stimulating rays. Such a center is referred to simply as "center" or "central portion" or "stimulable phosphor sheet central portion" throughout the specification including claims.

We claim:

1. A radiation field recognition method for recognizing a radiation field emitted by a stimulable phosphor sheet having a central portion, wherein said stimulable phosphor sheet has been irradiated and a latent image formed thereon, and a light image signal carrying the latent radiation image is derived by exposing said stimulable phosphor sheet to stimulating rays to cause light to be emitted by said stimulable phosphor sheet and using a photodetection means to photoelectrically detect said emitted light comprising:

obtaining candidate edge points that may be considered to be edge portions of said radiation field on said stimulable phosphor sheet in the course of obtaining a light image signal carrying the latent radiation image information recorded thereon;

obtaining curves in respect of candidate edge point coordinates $(x_0, Y_0)$, said curves being expressed as $$\rho = x_0 \cos\Theta + y_0 \sin\Theta$$

with $x_0, y_0$ being constants, when coordinates of said candidate edge points in a rectangular coordinate system set on the sheet are taken as $(x_0, y_0)$;

from points of mutual intersection $(\rho_0, \Theta_0)$ of said curves thus obtained, obtaining a first plurality of first straight lines in said rectangular coordinate system that are defined by $$\rho_0 = x \cos\Theta_0 + y \sin\Theta_0$$

and recognizing a region enclosed by said first straight lines as a radiation field.

2. The radiation field recognition method according to claim 1, wherein said recognizing step further comprises:

defining a second plurality of second straight lines linking corner portions of said stimulable phosphor sheet with a central portion thereof, said first and second lines lying in a common plane, discriminating the absence or presence of points of intersection between said first and second lines and when there are such points of intersection, of the parts into which the plane has been divided by said first straight lines, disregarding the part that includes corner portions of said stimulable phosphor sheet to thereby extract a region enclosed by said first straight lines.

3. The radiation field recognition method according to claim 1, wherein said recognizing step further comprises:

identifying points of intersection for pairs of said first straight lines;

extracting for each said pairs points of intersection whereby second lines linking said points of intersection with said central portion of the sheet do not intersect other of said first straight lines, using the points of intersection thus obtained as vertices, extracting a polygonal region with portions of said first straight lines forming the sides thereof.

4. The radiation field recognition method according to claim 1, wherein said recognizing step further comprises:

setting said central portion as an origin of said rectangular coordinate system, and extracting a region enclosed by said first straight lines by disregarding regions of said stimulable phosphor sheet, with respect to said first straight lines, corresponding to the following:

If $\pi/4 < \theta_0 \leq 3\pi/4$ (1)
then $y > (\rho_0 - x\cos\theta_0)/\sin\theta_0$ If $3\pi/4 < \theta_0 \leq 5\pi/4$ (2)
then $x < (\rho_0 - y\sin\theta_0)/\cos\theta_0$ If $5\pi/4 < \theta_0 \leq 7\pi/4$ (3)
then $y < (\rho_0 - x\cos\theta_0)/\sin\theta_0$ If $7\pi/4 < \theta_0 \leq 2\pi$ or $0 < \theta_0 \leq \pi/4$ (4)
then $x > (\rho_0 - y\sin\theta_o)/\cos\theta_0$.

* * * * *